UNITED STATES PATENT OFFICE.

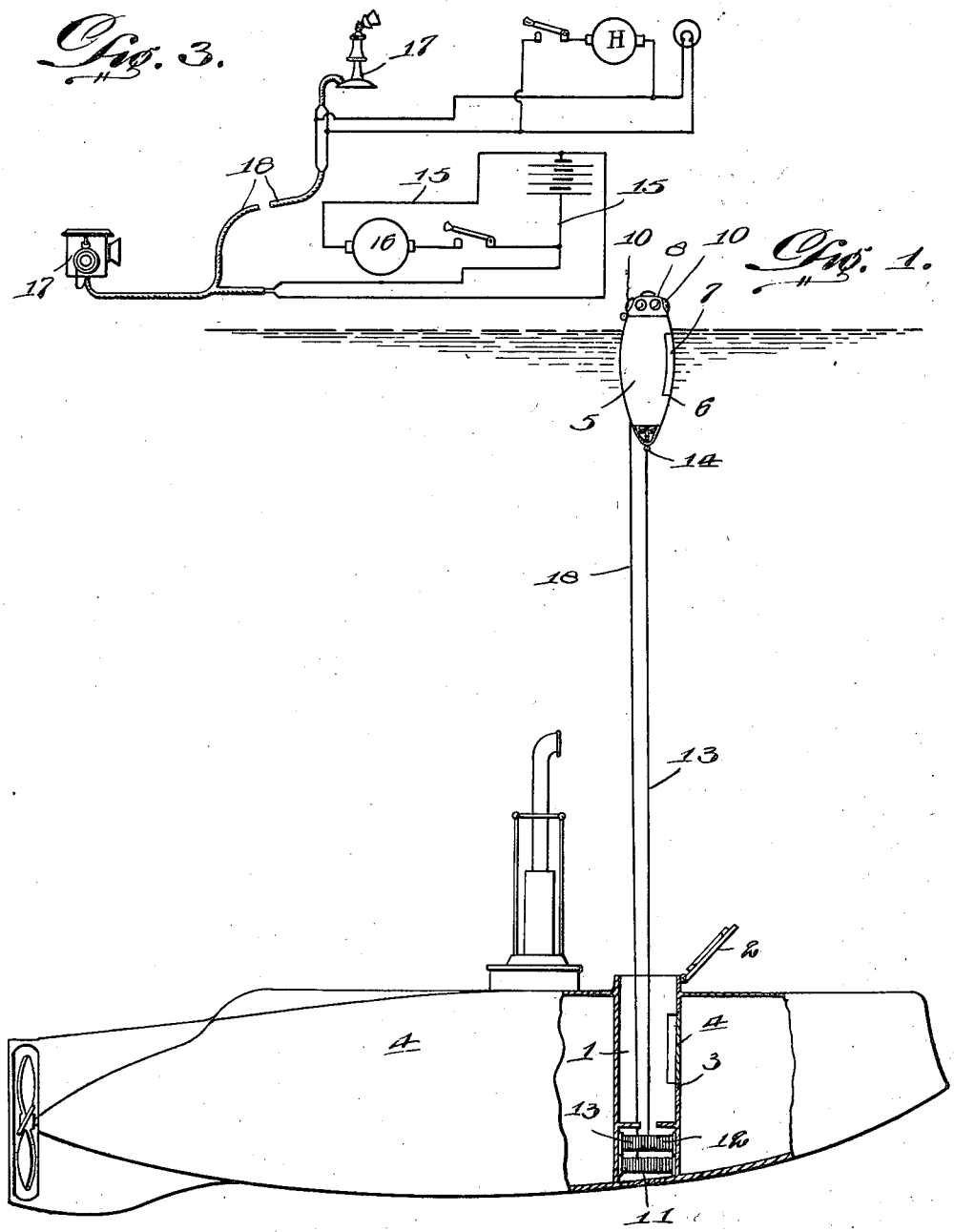

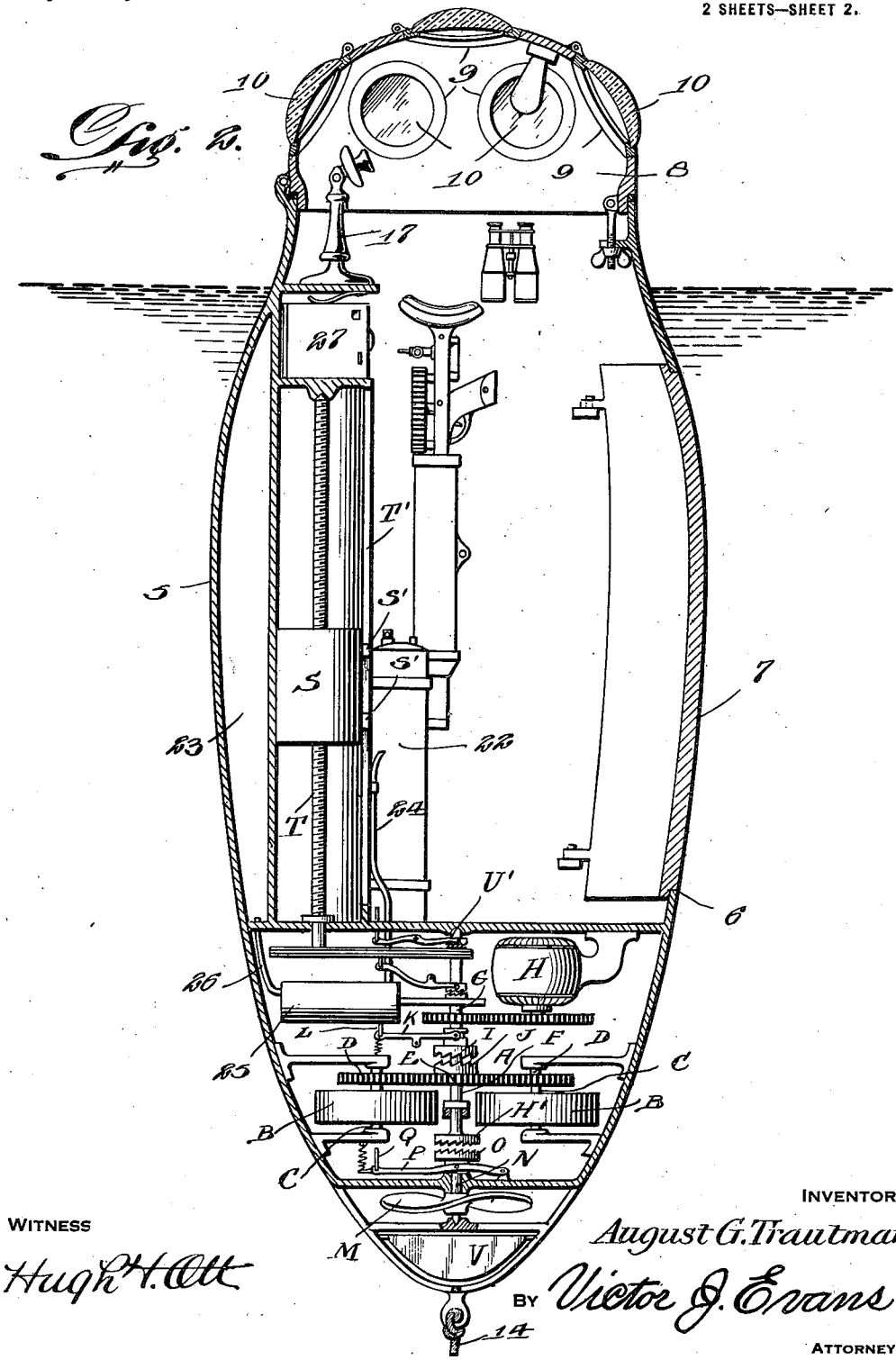

AUGUST G. TRAUTMAN, OF NEW YORK, N. Y.

SUBMARINE SAFETY AND OBSERVATION DEVICE.

1,263,155.      Specification of Letters Patent.      Patented Apr. 16, 1918.

Application filed February 27, 1917. Serial No. 151,271.

*To all whom it may concern:*

Be it known that I, AUGUST G. TRAUTMAN, a citizen of the United States, residing at New York, in the county of New York and State of New York, have invented new and useful Improvements in Submarine Safety and Observation Devices, of which the following is a specification.

This invention relates to under-sea or submarine vessels and particularly to a combined life saving and observation apparatus and has for its principal object, the provision of apparatus of this character which will include a body or container which is normally disposed within the vessel and construction whereby it is adapted to have communication therewith in order that one or more persons within the vessel can gain passage to said body or container and then find their escape from the vessel by means which will operatively cause the container to be projected to the surface of the water while the submarine vessel itself remains at a lower level.

Another object of the invention resides in the provision of an observation apparatus which will accommodate one or more persons; one which will be equipped with means whereby the occupant of the container can freely communicate with the occupant of the vessel after the container rises to the level of the water, and means whereby the container may be supplied with oxygen in order that the occupant may remain absolutely inclosed within the container for a considerable period of time, while making external observations.

Another object of the invention is to provide an apparatus of this character which will include means for positively causing the container to rise to the surface of the water when such occasion becomes necessary, and means for effectually returning the container to its normal position within the vessel and for rapidly performing this function as soon as the occasion necessitates.

A still further object of the invention resides in the provision of an apparatus of the described character which will consist of a container having means for establishing lateral stability to permit the container to be properly balanced as it is moved vertically in the water, combining therewith mechanism for shifting the center of gravity of the container when the stabilizing means is inactive, and further combining with the above, a propelling mechanism which is designed to cause the container to be propelled in a body of water and beneath the surface thereof and guided according to the desires of the operator.

With the above and other objects in view which will appear as the nature of the invention is better understood, the same consists in the improved construction and novel arrangements of parts which will hereinafter be fully described and particularly pointed out in the claims.

In the accompanying drawings, has been illustrated, a single and preferred form of the invention, it being, however, understood that no limitations are necessarily made to the precise structural details therein exhibited, but that changes, alterations and modifications within the scope of the claims may be resorted to when desired.

Figure 1 is a side elevation of a submarine with a combined life saving and observation apparatus in operative position.

Fig. 2 is a detail sectional view of the combined life saving and observation apparatus.

Fig. 3 is a diagrammatic view of the electric circuit and controlling means.

The invention which is provided for the dual purpose mentioned, is combined as herein shown with what is known as a submarine or under-sea vessel but I wish it clearly understood that I by no means, wish to limit myself to use of this specific character. This is only reasonable in that the apparatus may be combined in the structure of any sea-faring craft where it may be usefully brought into play when the vessel is in distress, such as at the time when the vessel is sinking. The submarine vessel illustrated at 4, may be of any usual design except for the provision of a vertical tube 1, which extends preferably through the entire depth of the vessel. Said tube opens onto the top of the vessel and the same is closed by an air and water-tight cover 2. The tube is also provided with a horizontal opening at one side, illustrated at 3, and said opening is adapted to be covered under normal conditions by a swinging cover 4.

Arranged to slide within the tube is a buoyant container 5, having an opening 6, at one side, and a closure 7. This container, when normally arranged in the tube, has its opening 6, in registration with the opening 3. This is necessary in order that the occupants of the submarine vessel may find escape to the container when the closures 4 and 7, are opened.

The container 5, is provided at its top with an air and water tight cover or crown 8, having view openings 9, which are covered by transparent swinging panels 10. The container may be made according to specified purposes and in the present instance, is intended to accommodate a single occupant. When the occupant is standing, his head may be extended into the dome-like cover 8, in order that he can observe conditions on the seas through the transparent panels 10. The said panels are therefore arranged in an annular series around the cover so that the operator can readily collect information as may be observed when looking upon the water in several different directions.

When the container 5, is in its normal position, the cover 2, extends over the cover 8, and as the former is of air and waterproof formation, water from the outside, will of course, not enter said container. At the base of the tube 1, are revolving drums 11 and 12, the latter having a cable 13, thereon, whose end 14, is connected to the base of the container. An electric circuit 15, is herein indicated and the same includes a driving motor 16, having operative connection with the drums 11 and 12. In the electric circuit is arranged telephones 17, and a flexible conduit 18, containing the wires which connect said telephones. This conduit is wound around the drum 11, and operatively extended through the container 5, where it is connected with the telephones 17, therein. These drums are adapted to be simultaneously released so that the cable 14, and the conduit 18, can be paid out or wound up respectively at the same time. Incident to the arrangement described, it is seen that when the cover 2, of the submarine vessel A, is opened, the drums 11 and 12, may be released and the container 5, permitted to rise to the surface of the water.

An oxygen tank 22, of any well known design is arranged within the container 5, for the purpose of supplying same with oxygen during the time that an occupant is confined within said container. A reserve tank 23, is also provided in the container 5, whereby air from the outside may be collected and accumulated. For this purpose, a tube 24, is provided which leads to a pump 25. A by-pass 26, is located between the pump and said reservoir 23, in order that the atmospheric air may be conveyed to said reservoir when the hose 24, is arranged in communication with the outside atmosphere. This can be done by extending the hose through the cover 8, in any suitable well known manner.

Aside from the structural elements referred to, the container 5, is provided with a camera 27, whereby the operator can take pictures of objects which may be located in the immediate proximity of the container. When the container is operatively projected to a position for taking observations, only the cover 8, is projected above the surface of the water. The cover may be suitably painted so that it cannot be detected by persons in its immediate proximity.

A stabilizer or balancing mechanism A, is employed, the same consisting of gyroscopes B—B, as conventionally shown, and operatively mounted upon shafts C—C. Each of said shafts carries a fixed gear wheel D, arranged in mesh with a driving gear wheel E, on a driver shaft F. A driving shaft G, receives its power from a motor H, and the former is shown to include a sliding clutch element I, and a fixed clutch element H'. A fixed clutch element J, is adapted to co-act with said element I, and the latter is therefore provided with an operating lever K, and controlling means L.

A propeller M, on a shaft N, is adapted to set the container in motion for a purpose to be hereinafter described and it is designed to receive its power from the shaft G, through said element H', and its co-acting element O, on said shaft N. The element O, is free to slide on said shaft N, and the same includes a lever P, and controlling connection, Q. Springs R, are employed for normally holding the elements I and O, out of engagement with their mating elements H' and J. In this manner it is seen that the propelling mechanism and said balancing mechanism can be either singly or simultaneously set in motion.

In order that the center of gravity of the container may be shifted when the gyroscopes are not in motion, I employ a sliding weight S, mounted upon a threaded shaft T, the latter receiving its power from a motor H, which includes a starting and stopping means U'. The weight carries lugs S', which move in fixed guides T'—T', whereby the same will be moved in the length of said shaft T, as the latter revolves.

Through this arrangement, it follows that after the tube has been raised to the level of the water, the operator may cause the same to descend at will to any desired depth and then by actuating said weight S, the tube will be canted or guided at any desired angle up or down and propelled through the water by the propelling mechanism. It may be made to describe a circular path by means of a suitable rudder V.

Aside from the uses described, the apparatus may be employed for the purpose of laying mines, attacking vessels of the enemy by coming up in the water at the side of the vessel in a manner which will not arouse suspicion. Explosives can very readily be attached to the vessels of the enemy as it follows that after the vessel has been sighted by one in the mentioned container, the latter can be lowered below the surface of the water and signals then given to the submarine to proceed in the direction beneath the vessel sighted in order that the operator on giving further signals can be raised again to the surface of the water. Explosives can also be fired from the opening in said cover 8, of the container, and if desired guns can be very conveniently arranged beneath the cover for this purpose.

What is claimed as new is:—

1. A submersible vessel including a balancing mechanism for maintaining lateral stability of said vessel, propelling mechanism for said vessel, and means for normally maintaining a vertical position of said vessel and for changing its normal vertical position to selected angular positions.

2. A submersible vessel including a balancing mechanism for miantaining lateral stability of said vessel, propelling mechanism for said vessel, and means for normally maintaining a vertical position of said vessel and for changing its normal vertical position to selected angular positions, and means for lowering said vessel in the water while the same is in a vertical position.

3. A floating body, means for adjusting said body angularly in the water, means for causing said body to descend in the water while in a vertical position, and means for propelling said body while in other positions in the water.

4. A floating body, means for adjusting said body angularly in the water, and for maintaining the same in a vertical position at times, and balancing mechanism for maintaining lateral stability of said body.

5. A floating body, a gyroscope carried thereby, controlling means therefor, and mechanism for changing the angular position of the vessel while submerged when the gyroscope is at rest.

6. A vessel having a tube, a floating body in said tube, means for launching said body from the tube when the vessel is submerged, means for causing said body to maintain a vertical position and for shifting said body from a vertical position to selected angular positions, means for effecting a return of said body to the tube, a closure for said tube, and propelling mechanism carried by said body.

7. A floating body having a normally vertical bow, means for causing said body to ascend to the surface of the water with its bow uppermost, the bow having observation openings therein, a gyroscope for maintaining lateral stability of said body, and means for shifting the center of gravity of said body while submerged.

8. A floating body having a normally vertical bow, means for causing said body to ascend to the surface of the water with its bow uppermost, the bow having observation openings therein, a gyroscope for maintaining lateral stability of said body, means for shifting the center of gravity of said body while submerged, and means for propelling said body.

9. A floating body having a normally vertical bow, means for causing said body to ascend to the surface of the water with its bow uppermost, the bow having observation openings therein, a gyroscope for maintaining lateral stability of said body, means for shifting the center of gravity of said body while submerged, means for propelling said body, and mechanism for causing said body to descend.

In testimony whereof I affix my signature.

AUGUST G. TRAUTMAN.